United States Patent Office 3,480,084
Patented Nov. 25, 1969

3,480,084
COMPOSITION AND METHOD USING TEMPORARY SOILD DIVERTING AGENT FOR AQUEOUS FLUIDS
Louis H. Eilers, Tulsa, Okla., assignor to The Dow Chemical Company, Midland, Mich., a corporation of Delaware
No Drawing. Filed Mar. 25, 1968, Ser. No. 715,547
Int. Cl. E21b 33/138; C08b 27/02
U.S. Cl. 166—282                                                8 Claims

ABSTRACT OF THE DISCLOSURE

A composition comprising: a material consisting substantially of whole and/or cracked natural grains or seeds, a particulated finely subdivided thickening agent, and an aqueous carrier or vehicle and the method of treating a subterranean formation penetrated by a wellbore which comprises injecting said composition down the wellbore and forcing at least some of it into the formation where such diverting agent serves as a temporary plugging agent to divert fluid to less accessible or tighter portions of the formation. Phthalic anhydride is also advantageously employed as an ingredient in the composition to aid in break down of the diverting agent, due to hydrolysis of the phthalic anhydride, thereby aiding in breaking the gel and subsequent removal of diverting agent from the formation.

---

In the treatment of a fluid-bearing subterranean formation penetrated by a wellbore, e.g. by injecting an acidizing or fracturing fluid into such formation to stimulate the flow of the natural fluid toward the wellbore, there is often a need for incorporating into such injected fluid an agent which temporarily inhibits too rapid dissipation of the injected fluid through existing channels, fissures, and the like in the formation. Unless inhibition of such rapid dissipation is effectuated, very often the injected fluid takes courses in the formation wherein stimulation of production of natural formation fluids is least needed and often where such natural fluids have already been depleted. As a result, fluid following such courses of less resistance to flow is not available to be forced into the tighter portions of the formation where stimulation of the flow of natural fluids is most needed.

To alleviate this difficulty, one or more of a number of known fluid-loss control agents have been admixed with fluids injected into a geologic formation in attempts to divert the injected fluid from the more open and readily accessible portions of the formation to the tighter portions. Many of such fluid-loss control agents heretofore used, if effective as a diverting agent, have had a tendency to plug, more-or-less permanently, the channels into which they lodge.

The principle object of this invention is to provide a temporary plugging agent to close off for a limited time the more open channels in the formation, i.e. while the agent is being injected, but which agent subsequent to injection softens rather rapidly and, in general disintegrates sufficiently to be readily pumpable and easily dislodged and removed from the formation.

The invention is (A) a novel composition of matter comprising (1) an aqueous carrier liquid, (2) a pulverized natural or synthetic gum or resin or metal soap type thickening or suspending agent, of a particle size and possessing gelation properties to produce a viscosity in the liquid of at least about 10 centipoises and preferably at least about 100 centipoises, and (3) a diverting agent of substantially whole or cracked grains or seeds preferably having a relatively tough hull or dermis and a variation in particle size so that there is at least about 30 mesh sipes difference between the smallest and largest sizes present within an overall range of between about 3 and 325 mesh and (B) the method of treating a subterranean formation penetrated by a wellbore comprising injecting said composition down the wellbore and at least a portion thereof into the formation.

In a preferred embodiment of the invention, phthalic anhydride is present as a fourth ingredient for the purpose of allowing the diverting agent to go into suspension, remain therein during injection, but which thereafter becomes completely hydrolyzed within a relatively short time, breaks the gel, and permits easy removal of the diverting agent from the formation.

The thickening or gelling agent can be any one or more liquids or solids known to impart increased viscosity and suspending properties to an aqueous liquid. Pulverized natural gums are highly satisfactory, e.g. guar, soy bean, karaya, Irish moss, tragacanth, kelp, acacia, and the starchy and/or proteinaceous portions of natural grains and seeds which tend to form a colloidal suspension in water or aqueous solutions. Pulverized synthetic resins are also highly satisfactory, among which are polyvinyltoluene sulfonate, polystyrene sulfonate, acrylamide (both linear and cross-linked), and particularly alkali metal salts of the polymers. Metal soaps, e.g. carboxylates of Na, K, or of other metals are satisfactory gelling or thickening agents, either alone or in admixture with the natural or synthetic resin, although the latter are preferred because of their more controllable, and quite acceptable gellation period.

The particle size of the thickening agent should be such that at least about 90% passes through a 100 mesh screen and substantially all the balance passes through a 60 mesh screen.

The selection and amount of gelling agent should be such as to increase the viscosity of the aqueous vehicle to at least about 10 centipoises and preferably to at least about 100 centipoises. An amount of between about 0.1% and 5.0%, by weight of the aqueous vehicle, may be operable, but between about 0.5 and 2.0% is usually used. The limit of the amount of gelling agent is merely one of practical limits, i.e. when the aqueous liquid tends to become too viscous it is unwise to use more.

The diverting agent includes all sorts of natural grains and/or seeds and particularly comprises a mixture thereof, so long as there is a difference in the largest and smallest grains or seeds present.

The seeds may be circular, flat, oblong, oval, or other shape so long as they remain in suspension, do not readily disintegrate or grow undesirably pulpy, or tend to form coalescent masses, and do remain substantially in suspenison during the well treating operation. The wider the range of size of seeds or grains, between about 3 mesh and 325 mesh, the more effective is a given quantity of the diverting agent. The desirable range of sizes of diverting agent to use in the invention would be one wherein mesh sizes represent substantially equal numbers of particles all the way from 3 to 325 mesh. However, ranges of particle size of which about one-third by weight are of between 3 and 10 mesh, about one-third smaller than the openings in 10 mesh but larger than the openings in 25 mesh, and the remaining third smaller than the openings in 25 mesh but larger than the openings in 325 mesh are acceptable. The seeds or grains are preferably whole, but improved results are sometimes obtained when a portion thereof are cracked seeds or grains of the desired particle size. Processed grains or seeds (i.e. those having been treated chemically or mechanically) are also acceptable so long as they are of proper size and the requirements of colloidal suspension and integrity or discreteness in the aqueous medium persists. The seed or grain diverting agent, after remaining as discrete particles during injection, must disintegrate sufficiently to be solubilized and later removed from the formation either by flushing or in producing fluids from the formation.

Illustrative of acceptable diverting agents for use in the practice of the invention are peas, milo, wheat, barley, alfalfa, clover, weeds in general, sunflower, safflower, cotton, soy beans, grasses and seeds of deciduous trees. The Austrian pea is especially suitable because it not only is tough enough to retain its discreteness and to remain suspended during injection, but in its commercially available form often has a particle size range such that 75% or more is between 0.25 and .187 inch (i.e. varying between about 3 and 4 mesh) and the balance is of smaller size. Milo is likewise especially suitable to use with the peas because it also not only possesses all the requisite properties of the diverting agent but is commercially available, and often varies in particle size such that at least about 75% by weight are between 0.187 and 0.08 inch (i.e. between about 4 to 10 mesh), and the balance is of smaller size but larger than 325 mesh.

The amount of diverting agent may be from about 1% by weight of the composition to the point of interference with pumpability, e.g. as much as 60%. The usual amount employed is between 6% and 30%.

The use of phthalic anhydride is helpful, first by replacing a portion of the grains by a completely water soluble agent, and secondly upon dissolution the phthalic anhydride hydrolyzes to phthalic acid. The gel and grain materials are thereby broken down by the acidic solution, thereby leading to easy removal of the diverting agent from the formation.

The amount to use may be up to about 60% by weight of the total solids in the composition (diverting agents plus gelling agent), but usually is not more than 40% of the total solids in the formulation. The phthalic anhydride particle size is selected to replace an equivalent amount of similar particle size grain material so that the overall particle size distribution is not materially changed. The particle size is selected also to produce the desired rate of solubility of phthalic anhydride in aqueous solution. The larger the particles, the slower the rate of solution. Larger particle sizes, e.g. 10 to 40 mesh, are readily available and have satisfactory solubility rates in the temperature range of 125 to 250° F.

The usual procedure followed to prepare the composition of the invention is to either (1) admix the gelling agent with the water, acid, or brine and thereafter admix the diverting agent therewith or (2) premix the gelling agent and diverting agent in substantially dry form and thereafter admix the resulting mixture with the water, acid, or brine. Sometimes a portion of the gelling agent is first admixed with the aqueous vehicle and thereafter an additional amount added with the diverting agent. The diverting agent may be admixed with the aqueous vehicle first but such procedure is less expedient. Phthalic anhydride, or other gel-breaking agent may be added at any time but is best added with the diverting agent.

The usual procedure for treating a well is to admix some or all of the gelling agent with the aqueous liquid, either in a stationary or portable mixing tank or unit transfer or injection tubing or pipe and thereafter to admix the diverting agent and additional gelling agent if needed. The mixture is injected at sufficient pressure to force some of it into the formation (and to fracture if such is an objective) during which the diverting agent lodges in more accessible openings and diverts fluid being concurrently injected, or injected shortly thereafter, to less accessible portions of the formation. After from about one to about 12 hours (dependent in part on the pH and temperature conditions) the diverting agent is sufficiently degenerated or solubilized to be removed by flushing or by producing fluids from the formation.

EXAMPLE 1

The solids of the following recipes are illustrative of the composition of the invention:

Recipe A

| | Parts |
|---|---|
| Austrian peas | 10–20 |
| Milo maize | 10–20 |
| Phthalic anhydride | 10–30 |
| Soy bean meal | 10–25 |
| Guar meal | 10–25 |

The larger sizes of the soy bean meal and guar meal act as diverting agents wherein the finer portion acts as a gelling agent. Any of a number of other wheat or cracked grains or seeds and/or of gelling agents other than soy bean meal or guar meal, of course may be used. The particular size of Austrian peas and milo maize supplement each other and are both admirably suited as to toughness when injected; but do subsequently thereafter degenerate and become as easily removed as desired.

The following mix A was prepared, in parts by weight:

| | |
|---|---|
| Austrian peas | 10 |
| Milo maize | 20 |
| Phthalic anhydride | 30 |
| Soy bean meal | 15 |
| Guar meal | 25 |

The mixture was passed through a series of sieves and gave the following results:

| Retained on a: | Mix A, percent |
|---|---|
| 4 mesh sieve | 9 |
| 10 mesh sieve | 30 |
| 20 mesh sieve | 27 |
| 40 mesh sieve | 14 |
| 100 mesh sieve | 14 |
| Fines, passing through 100 mesh sieve | 6 |

Other mixtures of diverting agents and gelling agent were prepared, but not according to the invention. The following results were obtained:

| Retained on a— | Mix B | Mix C |
|---|---|---|
| 4 mesh sieve | 0 | 17 |
| 10 mesh sieve | 7 | 43 |
| 20 mesh sieve | 25 | 0 |
| 40 mesh sieve | 35 | 12 |
| 100 mesh sieve | 24 | 21 |
| Fines, passing through a 100 mesh sieve | 9 | 7 |

In the above mixes, some fines (small than 100 mesh sieve openings) were present in the Austrian peas and milo maize. This is not objectionable.

Tests on the three mixes, (A), (B), and (C) were conducted as follows:

Each of the above three mixes was suspended in an aqueous solution in amounts shown in Table I below, containing either 1% gum karaya or 1% guar gum as a thickening agent. The specimen so made was placed in a steel reservoir, provided at one end with a steel slotted opening one inch long. Slots of 0.25 inch and 0.15 inch width were available, thereby simulating openings in geologic formations. The other end of the pipe was capped, but had an opening provided for applying hydraulic pressure. Tests were conducted (at ambient temperature which was approximately 75° F.) until flow out through the slot was stopped. The pressure reading was then taken.

| Test No. | Additive Mix | Concentration in gms. per 100 ml. | Slot opening in inches | Fluid loss in ml. before shut off | Grams of additive mix needed to produce shut off | Pressure withstood (in p.s.i.) |
|---|---|---|---|---|---|---|
| 1 | Mix A | 24 | 0.15 | 200 | 48 | 2,000 |
| 2 | Mix A | 60 | 0.15 | 170 | 104 | 2,000 |
| 3 | Mix A | 1.2 | 0.15 | 3,500 | 42 | 2,000 |
| 4 | Mix A | 24 | 0.25 | 700 | 168 | 600 |
| 5 | Mix B | 24 | 0.15 | 1,200 | 288 | 2,000 |
| 6 | Mix C | 24 | 0.15 | 350 | 84 | 2,000 |

No test was continued above 2000 p.s.i.g. pressure in this series of tests.

Reference to Table I shows that the aqueous composition of the invention is an excellent diverting and temporary plugging agent since the pressure rose very moderately after some of the agent had become lodged in the slot, as would occur if the agent had come up against and into fractures in a geologic formation.

EXAMPLE 2

As an example of the emporary nature of the diverting plug, the following tests were made. Equipment similar to that used in Example 1 was used in these tests except that the reservoir was equipped at each end (beyond the previously mentioned openings) with valves which could be closed to maintain the reservoir and contents under pressure. It was also adapted with a heating jacket to reach and maintain a given temperature. Five hundred grams of solid diverting agent were prepared which contained 10% Austrian peas, 20% whole milo maize, 30% rolled (crushed) milo maize, 15% soy bean meal, and 25% soy bean flour. This was added to 2000 mls. of tap water thickened with 1% gum karaya and 0.1% sodium polystyrene sulfonate (0.33% of a 30% active material.) This was heated to 200° F. and then maintained against the 0.15 inch slot at 500 p.s.i. for 1 hour. Approximately 270 mls. of fluid was lost in the first five minutes and an additional 80 mls. in the next 55 minutes. The test section was closed by use of the valves and heated for an additional 21 hours. The test had 50 p.s.i. residual pressure. After the forementioned time, the plug broke and the fluid flowed readily through the 0.15 inch slot under the 50 p.s.i. pressure. Similar tests were conducted for 3 and for 6 hours. A pressure of 400 p.s.i. was required to break the plug after 3 hours and 150 p.s.i. was required to break the plug after 6 hours. After 6 hours, the fluid and solids remaining in the reservoir were reversed out through a 0.1 inch slot at a pressure of 75 p.s.i. without pluging the slot.

EXAMPLE 3

An old gas well in southern Texas was producing gas from the Edwards formation at the rate of approximately 0.5 million cu. ft. per day. This well was acidized using a diverting plug in water. The diverting plug contained 10 lbs. whole Austrian peas, 20 lgs. whole milo maize, 30 lbs. flake phthalic anhydride, 25 lbs. guar meal, 15 lbs. soy bean meal, 3 lbs. gum karaya and 1 lb. of a 30% active sodium polystyrene sulfonate in 4 barrels (168 gallons) of water. One thousand gallons of 28% hydrochloric acid were pumped down the tubing preceding the agent, the four barrels of diverting agent followed, and the final 1000 gallons of 28% inhibited hydrochloric acid were injected. The acid was flushed from the tubing and into the formation with water. The initial 1000 gallons of acid entered the formation at the rate of 5 barrels per minute at 2800 p.s.i. pressure. This pressure increased to 3900 p.s.i. as the diverting agent reached the formation and plugged existing channels. The final 1000 gallons of acid entered a new section of the formation at a reduced rate of about 2.5 barrels per minute at 3800 p.s.i. pressure. Gas production on the well increased from initial 0.5 to 2.5 million cubic feet per day following the treatment.

EXAMPLE 4

This illustrates treatment of the Edwards formation in the San Miguel Creek gas field in Texas. The well was cored to a depth of 9948 feet with a 5½ inch casing and provided with a 2½ inch tubing to a depth of 9614 feet. A Baker 0 type packer was positioned in the annular space between tubing and casing at a depth of 9610 feet.

Water was first injected down the tubing at a rate of five 42-gallon barrels per minute at a maximum pressure of 2500 p.s.i.g. Inhibited aqueous 15% hydrochloric acid was then injected down the tubing at a rate varying between 2.5 barrels and 5 barrels per minute, the highest pressure (at the ground surface) which was reached was 2200 p.s.i.g. Four barrels of the aqueous fracturing fluid containing 100 pounds of the composition of the invention (which had been prepared according to Mix A above) was then injected. The pressure rose to 3900 p.s.i.g. in less than 5 minutes, thereby showing that the treatment according to the invention had plugged the larger fractures and channels in the formation being treated.

Additional inhibited 15% (by weight) aqueous HCl was then injected at 3800 p.s.i.g. for about 10 minutes at a rate of injection of about 2.5 barrels per minute. A total of 2000 gallons of acid was used during the complete treatment.

The well was allowed to stand for about two hours, during which time the ground level pressure on the injection line had subsided to 1900 p.s.i.g.

The well was then opened and put back into production. Gas production for the well showed definite improvement over that produced before treatment.

Having described my invention, what I claim and desire to protect by Letters Patent is:

1. A composition of matter effective for plugging cracks and crevices for a limited time when forced into such cracks and crevices comprising:
   (1) an aqueous carrier liquid, (2) a thickener or suspending agent selected from the class consisting of pulverulent guar gum, karaya gum, soy bean flour, Irish moss, tragacanth, kelp, acacia, starch, proteins, polystyrene sulfonate, polyvinyltoluene sulfonate, acrylamide, metal carboxylates, and mixtures thereof in an amount sufficient to increase the viscosity of the aqueous carrier liquid to at least about 10 centipoises, and (3) a diverting agent selected from the class consisting of substantially whole or cracked grains or seeds in an amount of between about 1.0% by weight of the aqueous carrier liquid and that amount which renders the composition substantially unpumpable, and of a particle size such that there is a range in size between the smallest seeds and the largest of about 30 mesh sizes, and about 90% by weight of the seeds are between 3 and 325 mesh.

2. The composition of claim 1 wherein there is present a gel-breaking agent.

3. The composition of claim 1 wherein said gel-breaking agent is phthalic anhydride in an amount of between about 1% and 40% of the combined weight of the gelling agent and diverting agent present.

4. The method of treating a subterranean formation penetrated by a wellbore, wherein fluid-loss to the formation is excessive, employing an aqueous-base treating composition comprising injecting down the wellbore and into the formation the composition of claim 1.

5. The method according to claim 4 where the aqueous treating composition is an inhibited aqueous acid solution.

6. The method according to claim 4 wherein the treating composition is injected into the formation at a pressure sufficiently high to fracture the formation.

7. The method of treating a subterranean formation penetrated by a wellbore, wherein fluid-loss to the formation is excessive, employing an aqueous-base treating composition comprising injecting down the wellbore and into the formation the composition of claim 2.

8. The method of treating a subterranean formation penetrated by a wellbore, wherein fluid-loss to the formation is excessive, employing an aqueous-base treating composition comprising injecting down the wellbore and into the formation the composition of claim 3.

References Cited

UNITED STATES PATENTS

| | | | |
|---|---|---|---|
| 1,807,082 | 5/1931 | Boynton | 175—72 |
| 2,364,434 | 12/1944 | Foster | 252—8.5 |
| 2,943,680 | 7/1960 | Scott et al. | 166—294 X |
| 3,022,249 | 2/1962 | Eberhard | 252—8.55 |
| 3,153,450 | 10/1964 | Foster et al. | 252—8.55 X |
| 3,390,723 | 7/1968 | Hower et al. | 166—292 |
| 3,405,062 | 10/1968 | Kuhn | 166—283 X |

STEPHEN J. NOVOSAD, Primary Examiner

U.S. Cl. X.R.

106—137, 209, 214; 166—283, 294